United States Patent [19]

Degen et al.

[11] 4,425,238

[45] Jan. 10, 1984

[54] REMOVAL OF ANIONIC COMPOUNDS FROM WATER

[75] Inventors: Hans-Juergen Degen, Lorsch; Wolf Guender, Neustadt; Friedrich Linhart, Heidelberg; Werner Auhorn, Frankenthal; Guenter Frey, Dannstadt-Schauernheim; Werner Streit, Bobenheim; Rolf Fikentscher, Ludwigshafen, all of Fed. Rep. of Germany

[73] Assignee: BASF Aktiengesellschaft, Rheinland-Pfalz, Fed. Rep. of Germany

[21] Appl. No.: 350,142

[22] Filed: Feb. 19, 1982

[30] Foreign Application Priority Data

Mar. 25, 1981 [DE] Fed. Rep. of Germany ....... 3111615

[51] Int. Cl.³ .............................................. C02F 1/56
[52] U.S. Cl. ................................. 210/666; 162/164.1; 162/164.3; 162/164.6; 162/168.1; 162/182.2; 162/181.4; 162/181.5; 210/667; 210/712; 210/727; 210/728; 210/917
[58] Field of Search ............... 210/666, 667, 725, 727, 210/728, 732–736, 917; 162/164.1, 164.3, 164.6, 168.1, 181.2, 181.4, 181.5

[56] References Cited

U.S. PATENT DOCUMENTS

| | | | |
|---|---|---|---|
| 3,157,595 | 11/1964 | Johnson et al. | 210/734 |
| 3,290,310 | 12/1966 | Morf et al. | 210/727 |
| 3,300,406 | 1/1967 | Pollio | 210/666 |
| 3,409,547 | 11/1968 | Dajani | 210/735 |
| 3,484,837 | 12/1969 | Odom et al. | 210/728 |
| 4,025,429 | 5/1977 | Neuschutz | 210/728 |
| 4,096,133 | 6/1978 | Zweigle | 210/734 |
| 4,276,160 | 6/1981 | Donnert et al. | |

FOREIGN PATENT DOCUMENTS

| | | |
|---|---|---|
| 2418979 | 10/1975 | Fed. Rep. of Germany . |
| 2552457 | 5/1977 | Fed. Rep. of Germany . |
| 50-30367 | 3/1975 | Japan .................................. 210/727 |
| 1490691 | 11/1977 | United Kingdom . |

*Primary Examiner*—Peter A. Hruskoci
*Attorney, Agent, or Firm*—Oblon, Fisher, Spivak, McClelland & Maier

[57] ABSTRACT

A process for removing anionic compounds from water which is recycled in manufacturing processes, and from waste water, by adding (1) water-soluble products obtained by reacting an alkylating agent, having an aromatic substituent, with a cationic polyelectrolyte and (2) mineral adsorbents and/or a magnesium salt, aluminum salt or iron salt, with formation and flocculation of water-insoluble reaction products.

11 Claims, No Drawings

REMOVAL OF ANIONIC COMPOUNDS FROM WATER

German Published Application DAS No. 2,503,169 discloses a process for decolorizing aqueous solutions, such as waste water, containing water-soluble anionic organic dyes, wherein the water-soluble dyes are precipitated by adding water-soluble cationic or ampholytic polymers.

Wochenblatt für Papierfabrikation 15 (1974), 559–561, discloses that paper dyes, dissolved in water, may be removed by precipitation, if the water is treated with bentonite and polyacrylamide, with or without aluminum sulfate. It is true that using this process basic dyes are, with only a few exceptions, removed virtually completely from the waste water or from an aqueous solution, but acid dyes cannot be precipitated from aqueous solutions by this method.

It is an object of the present invention to provide a process for removing anionic compounds from water which is recycled in manufacturing processes, and from waste water, by adding cationic polymeric assistants, with formation and flocculation of water-insoluble reaction products, the process being applicable not only to a particular class of dye but to water-soluble anionic compounds in general.

We have found that this object is achieved, according to the invention, if the cationic polymeric assistants employed are water-soluble products obtained by reacting an alkylating agent, having an aromatic substituent, with a cationic polyelectrolyte, and if they are used in combination with mineral adsorbents and/or a magnesium salt, aluminum salt or iron salt.

In many manufacturing processes in which water is recycled, anionic compounds frequently accumulate and, in most cases, have an adverse effect on the particular manufacturing processes. Thus, for example, in the manufacture of paper, anionic compounds such as humic acids, ligninsulfonic acids and oxidized polysaccharides accumulate in the recycled water of the papermaking machine. These substances may accumulate to such a degree that they greatly reduce, or destroy, the effectiveness of the cationic assistants conventionally employed in paper manufacture, for example flocculants, drainage aids and retention agents. However, the adverse effects of these anionic compounds can be substantially or completely eliminated by removing the interfering anionic compounds from the recycled water by means of the process according to the invention. Examples of other anionic compounds which can be removed, according to the invention, from an aqueous medium are carboxymethylcellulose, anionic starches, dyes and oxidized polysaccharides. The process according to the invention is also applicable to the removal of anionic compounds from waste water, for example removal of the anionic compounds mentioned above, polyacids, phenol-formaldehyde resins, phenolsulfonic acid/formaldehyde resins and naphtholsulfonic acid/formaldehyde resins. However, their application to the removal of water-soluble anionic dyes from waste water is particularly important. Accordingly, the process according to the invention is important not only in the paper industry but also in other operations in which colored waste water results, for example in dyeing and tanning. The process according to the invention can also be employed in sewage farms for purifying industrial sewage and communal sewage.

The process according to the invention may be illustrated by reference to paper manufacture, and the production of colored papers. Papers are very frequently colored with acid or direct dyes, or with mixtures of these two types of dye. The dyes are anionic dyes.

Acid dyes are listed, for example, in the Color Index, volume 1, 3rd edition, The Society of Dyers and Colorists and American Association of Textile Chemists and Colorists, pages 1003–1560. Some typical examples of acid dyes which are particularly suitable for coloring paper are the yellow acid dyes C.I. 13,065 and 47,035, the orange dyes C.I. 13,090, C.I. 15,575 and C.I. 15,510 and the red acid dyes C.I. 45,380 and C.I. 15,620. Direct dyes are given on pages 2007–2477 of the Color Index, volume 2. Typical direct dyes usually employed to color paper are the yellow direct dyes C.I. 29,000, C.I. 24,895, C.I. 13,950, C.I. 29,025, C.I. 40,000, C.I. 40,001 and C.I. 24,890, the orange direct dyes C.I. 40,215, C.I. 40,265 and C.I. 29,156, the red direct dyes C.I. 29,175, C.I. 28,160, C.I. 22,120 and C.I. 25,410, the blue direct dyes C.I. 23,155 and C.I. 24,340 and the violet direct dye C.I. 25,410.

The cationic assistants used for the process according to the invention are water-soluble and are prepared by reacting an alkylating agent, having an aromatic substituent, with a cationic polyelectrolyte. Examples of suitable alkylating agents are benzyl halides, eg. benzyl chloride, benzyl bromide and benzyl iodide, styrene oxide, chloromethylbiphenyls and bischloromethylbiphenyls, eg. 4-chloromethylbiphenyl and 4,4'-bis-chloromethylbiphenyl, and α- and β-halomethylnaphthalenes, eg. α-chloromethylnaphthalene, β-chloromethylnaphthalene, α-bromomethylnaphthalene and β-bromomethylnaphthalene. In addition to the groups mentioned, the aromatic substituents of the alkylating agents may carry other substituents, for example $C_1$–$C_{12}$-alkyl, chlorine, bromine, phenyl, p-chloromethylphenyl, hydroxymethyl and chloromethyl. The preferred alkylating agent is benzyl chloride.

In principle, any cationic polyelectrolyte can serve as the second component for the preparation of the cationic assistant. Preferably, the cationic polyelectrolyte used contains aminoalkyl groups. Examples of suitable cationic polyelectrolytes include polyethyleneimines which possess not less than 5 aminoalkyl groups, polyvinylamines and crosslinking products of ammonia or amines, especially of diamines or oligoamines, with 1,2-dichloroethane, epichlorohydrin, dichlorohydrin ether or chlorohydrin ethers of dihydric or polyhydric alcohols. Dichlorohydrin ether is obtained by, for example, reacting 2 moles of epichlorohydrin with one mole of water. Chlorohydrin ethers of dihydric or polyhydric alcohols are derived from glycols or polyols which have molecular weights of at most 300 and which are obtained by reaction of from 1 to 1.5 moles of epichlorohydrin per mole of OH groups in the polyhydric alcohol or polyglycol, using an acid catalyst (eg. $H_2SO_4$ or $BF_3$). Examples of suitable diamines or oligoamines are ethylenediamine, propylenediamine, diethylenetriamine, dipropylenetriamine, triethylenetetramine, bis-aminopropyl-ethylenediamine, tetraethylenepentamine, piperazine, aminoethylpiperazine, aminopropylpiperazine, diaminoethylpiperazine and diaminopropylpiperazine. The viscosity of the crosslinked products obtained with ammonia and the diamines or oligoamines is at most 40,000 mPa.s in 40% strength aqueous solution.

Polyvinylamines are prepared by, for example, subjecting vinylformamide to free radical polymerization and hydrolyzing the polymer in an acid medium.

Other suitable cationic polyelectrolytes are condensates, containing carboxamide groups, onto which alkyleneimine units have been grafted. This category of substances in particular includes polyamidoamines which are obtained by reacting dicarboxylic acids of 4 to 10 carbon atoms with polyalkylenepolyamines having from 3 to 10 basic nitrogen atoms in the molecule. Examples of suitable dicarboxylic acids are succinic acid, maleic acid, adipic acid, glutaric acid, suberic acid, sebacic acid and terephthalic acid. Mixtures of dicarboxylic acids, eg. of adipic acid and glutaric acid, or of maleic acid and adipic acid, may also be used to prepare the polyamides. Use of adipic acid alone is preferred. The carboxylic acids are condensed with polyalkylenepolyamines which contain from 3 to 10 basic nitrogen atoms in the molecule, eg. diethylenetriamine, triethylenetetramine, tetraethylenepentamine, dipropylenetriamine, tripropylenetetramine or dihexamethylenetriamine, or with mixtures of these compounds. The amines may contain up to 10% by weight of a diamine, eg. ethylenediamine or hexamethylenediamine. The condensation of the dicarboxylic acids with the polyalkylenepolyamines is preferably carried out undiluted, but can also be carried out in a solvent which is inert to the reactants. The condensation is carried out at from 80° to 200° C., and the water formed in the reaction is distilled from the system. The condensation can also be carried out in the presence of lactones or lactams of carboxylic acids of 5 to 12 carbon atoms, in which case these products are incorporated as condensed units into the polyamidoamine. From 0.8 to 1.4 moles of polyalkylenepolyamine are used per mole of dicarboxylic acid.

Condensates containing carboxamide groups are also obtained by reacting acrylic or methacrylic esters (derived from monohydric alcohols of 1 to 18, preferably 2 to 8, carbon atoms) with diamines (preferably of 2 to 6 carbon atoms), eg. ethylenediamine or hexamethylenediamine, or with oligoamines, ie. polyalkylenepolyamines having from 3 to 10 basic nitrogen atoms in the molecule. A further possible method of synthesis is to react urea with bis-aminoethylmethylamine.

The above water-soluble condensates containing carboxamide groups are cationically modified to a greater degree by introducing alkyleneimine units. This is done most simply by, for example, grafting alkyleneimines, especially ethyleneimine, onto the condensates in the presence of a Lewis acid, eg. boron trifluoride etherate, or of sulfuric acid. The grafting reaction is carried out with from 20 to 400, preferably from 50 to 300, parts by weight of ethyleneimine per 100 parts by weight of a condensate containing carboxamide groups. Products of this type are disclosed in, for example, German Published Application DAS No. 2,434,816.

Alkyleneimine groups can also be formed by reacting a mono-(aminoalkyl) sulfate with the condensate, containing carboxamide groups, at an alkaline pH. For example, the condensates containing carboxamide groups can be aminoethylated by reaction with mono-($\beta$-aminoethyl) sulfate.

The cationic polyelectrolyte is reacted either completely or only partially with the alkylating agent having an aromatic substituent; however, not less than 10% of the aminoalkyl groups of the cationic polyelectrolyte should be reacted with the alkylating agent. Specifically in the case of a reaction product of a piperazine and epichlorohydrin, partial quaternization of the cationic polyelectrolyte should preferably result in from 30 to 60% of quaternary nitrogen atoms.

Particularly effective assistants are obtained by modifying the reaction products of alkylating agents, having an aromatic substituent, and cationic polyelectrolytes, in a second stage, with cyanamide or dicyandiamide or a mixture of cyanamide and dicyandiamide. From 1 to 100, preferably from 5 to 20, parts by weight of cyanamide and/or dicyandiamide are used per 100 parts by weight of partially alkylated cationic polyelectrolyte. The reaction is carried out in aqueous solution at from 70° to 100° C.

For the purposes of the present invention, mineral adsorbents are finely divided minerals which have a large surface area. Examples of suitable materials of this type are alumosilicates, chalk, titanium dioxide, bauxite and satin white (calcium sulfoaluminate). Examples of suitable alumosilicates are talc and kaolin. The use of minerals of the montmorillonite type, eg. bentonite, is particularly preferred. The bentonite may be employed in a naturally occurring form or after activation with an acid or a base.

The Papiermacher Taschenbuch, Dr. Curt Haefner Verlag GmbH, 6900 Heidelberg (1980), under the heading "Fillers" on page 27, Table 1, states that the above materials have particle sizes of from 0.3 to 5 $\mu$m. However, substantially coarser mineral adsorbents may also be used, for example those in which, in the dry state, more than 80% of the particles have diameters of from 0.2 to 500 $\mu$m. In the case of swellable mineral adsorbents, for example of the montmorillonite type, it is the particle diameter in the moist state which matters. To achieve optimum surface area, the minerals must be exposed to powerful shearing forces while they are swelling. The mean particle size in the moist state should preferably be less than 50 $\mu$m, especially less than 10 $\mu$m.

Examples of suitable magnesium salts are magnesium sulfate and magnesium chloride. Where acid recycled water or acid waste water is to be purified, magnesium oxide and magnesium carbonate can also be employed. Amongst the iron salts, iron-II and iron-III sulfate, and iron-III chloride, are particularly suitable. Amongst the aluminum salts, it is especially alum and aluminum sulfate which are used industrially. Mixtures of the above inorganic salts may also be used, for example mixtures of iron-III sulfate and aluminum sulfate, or mixtures of iron-III chloride and alum, or mixtures of magnesium sulfate and aluminum sulfate. The amounts of metal salts employed are from 10 to 1,000% by weight, preferably from 20 to 200% by weight, based on the polymeric cationic assistant.

According to the invention, anionic compounds are removed from an aqueous system by bringing them into contact with a cationic polymeric assistant, having an aromatic substituent, mixed with a mineral adsorbent and/or a magnesium salt, aluminum salt or iron salt. The process can be carried out in various ways. For instance, the polymeric cationic assistant can first be added to the waste water or recycled water and allowed to act for a short time, after which a mineral adsorbent and/or one of the metal salts mentioned is added. It is also possible first to add the metal salts to the waste water or the recycled water, allow them to act, and only then add the cationic polymeric assistant.

A preferred method of use is to prepare a mixture of a cationic polymeric assistant and a mineral adsorbent and then to add this mixture to the aqueous system to be treated. In another embodiment of this procedure, a magnesium salt, aluminum salt and/or iron salt may additionally be employed. In a further embodiment of the process according to the invention, a mineral adsorbent, with or without a magnesium salt, iron salt and/or aluminum salt, is added to the waste water or recycled water to be treated, and only then is the cationic polymeric assistant added. According to a further embodiment, the polymeric cationic assistant is used together with magnesium salts, aluminum salts or iron salts.

The polymeric cationic assistant is employed in an amount which roughly corresponds to the amount of anionic compounds to be removed from the aqueous medium. These amounts may range from those particularly encountered with colored aqueous media, for example 1 mg of dye per liter, to larger amounts of colored or colorless materials. Preferably, the process according to the invention is employed to remove residual amounts of anionic compounds which are otherwise difficult to deal with. However, industrial use of the process is merely restricted by the fact that for larger amounts of anionic substances it competes in terms of economies with, for example, biological sewage treatment or effluent incineration; accordingly, the novel process is employed for amounts of anionic substances of from about 0.1 mg/l to about 10 g/l. The weight ratio of mineral adsorbent to polymeric cationic assistant is from about 20:1 to 0.5:1, preferably from 10:1 to 3:1.

When the polymeric cationic assistants, the mineral adsorbents and/or the metal salts act on the anionic compounds dissolved in water, insoluble reaction products are formed, which precipitate or flocculate. In order to accelerate the flocculation rate or sedimentation rate of these lakes, conventional amounts of the usual flocculants are added. Examples of such flocculants are nonionic, anionic and cationic polyacrylamides of high molecular weight. The cationic polyacrylamides can be prepared, for example, by reacting high molecular weight polyacrylamide with formaldehyde and dialkylamines in the manner of a Mannich reaction, or by copolymerizing acrylamide with cationic monomers, eg. dimethylaminoethyl acrylate, dimethylaminopropyl acrylate, dimethylaminobutyl acrylate or the corresponding esters of aminoalcohols and methacrylic acid. Examples of suitable nonionic flocculants are polyacrylamides, while anionic flocculants are in particular derived from copolymers of acrylamide with ethylenically unsaturated carboxylic acids, eg. acrylic acid. The flocculants are employed in an amount of from 0.1 to 10% by weight, preferably from 1 to 5% by weight, based on the lakes to be flocculated.

In papermaking, for example, it is possible to leave the lakes in the system and incorporate them into the paper. To do so, the procedure followed is, for example, to add to the recycled water one of the appropriate polymeric cationic assistants, a mineral adsorbent and/or a magnesium salt, aluminum salt or iron salt, and incorporate the lakes into the paper, on draining the fiber suspension, by effecting the drainage of the pulp on the wire.

Preparation of the cationic assistants

Assistant 1

259 g of a 49.9% strength aqueous solution of a polyethyleneimine of molecular weight 1,500 (Assistant 1a for Comparative Example 4) were introduced into a 1 liter four-necked flask equipped with a stirrer, reflux condenser, thermometer and dropping funnel, and were heated to 80°–85° C. The heating bath was then removed and 114 g of benzyl chloride were added dropwise in the course of 30 minutes, during which the temperature of the reaction mixture rose to 92° C. A solution of 38 g of cyanamide in 38 g of water was then added as a single shot, after which the reaction mixture was kept at 90° C. for 5 hours. It was then allowed to cool and 101 g of distilled water were added. 562 g of an aqueous solution of a partially benzylated cyanamide-modified polyethyleneimine, having a solids content of 51.1%, were obtained.

Assistant 2

259 g of a 49.9% strength aqueous solution of a polyethyleneimine of molecular weight 1,500 were introduced into a 1 liter four-necked flask equipped with a stirrer, reflux condenser, thermometer and dropping funnel, and were heated to 85° C. 114 g of benzyl chloride were then added dropwise in the course of 30 minutes, during which the temperature rose to 93° C. After completion of the addition, the reaction solution was heated for ½ hour at 90° C. and diluted with 113 g of distilled water. 486 g of a 50.3% strength aqueous solution of a partially benzylated polyethyleneimine were obtained.

Assistant 3

128 g of technical-grade piperazine and 65 ml of distilled water were introduced into a 1 liter four-necked flask equipped with a stirrer, reflux condenser, thermometer and dropping funnel, and were heated to 80° C. 88 g of epichlorohydrin were then added dropwise in the course of one hour, whilst cooling the flask in an ice-bath, and the temperature of the reaction mixture was then kept at 80° C. by cooling. The condensation took 3–4 hours and an aqueous solution having a viscosity of 4,500 mPa.s was obtained (Assistant 3a for Comparative Example 4).

183 g of distilled water and 80 g of 50% strength aqueous sodium hydroxide solution were then added, after which 126 g of benzyl chloride were introduced dropwise in the course of 1 hour at 70° C., and the reaction mixture was then stirred for 2 hours at 80° C. The solution was cooled to 30° C., and 133 g of distilled water and 200 g of 100% strength formic acid were added, with stirring. 999 g of a 20% strength aqueous solution of a piperazine resin having a viscosity of 33 mPa.s were obtained. The chloride content was 1.45 milliequivalent/g and the pH was 1.8.

Assistant 4

A polyamidoamine was first prepared by mixing 1,044 parts of water and 2,150 parts of diethylenetriamine under nitrogen at room temperature and adding 2,800 parts of adipic acid, with cooling. The reaction mixture was then heated so that the water originally added as well as the water formed during the condensation distilled off. Continuous distillation of the water for 5 hours resulted in a temperature of 170° C. in the distilled vessel. This temperature was maintained until the resin had an acid number of less than 10; this was reached after about 10 hours. The resin was cooled and, when the temperature had reached 130° C., 3,100 parts of water were added. An aqueous solution of 61.4% solids content was obtained.

The polyamidoamine thus obtained was grafted with ethyleneimine. To do so, 326 parts of the 61.4% strength resin were mixed with 4.5 parts of concentrated sulfuric acid in 70 parts of water and the mixture was heated to 80° C. 200 parts of a 50% strength aqueous ethyleneimine solution were then run in over 5 hours, with thorough mixing, after which the reaction mixture was kept at 80°–90° C. for a further 2–3 hours. The reaction can be regarded as complete only when ethyleneimine is no longer detectable with p-nitrobenzylpyridine. A 50.8% strength aqueous solution of an ethyleneimine-grafted polyamidoamine was obtained (Assistant 4a for Comparative Example 4).

This product was benzylated by mixing 192 parts of the 50.8% strength aqueous resin solution with 311 parts of water, heating the mixture to 80° C. and combining it, in the course of half an hour, with 76 parts of benzyl chloride at 80°–90° C. After completion of addition of the benzyl chloride, the reaction solution was heated at 90° C. for a further hour and then cooled. A 30.1% strength aqueous solution of a benzylated ethyleneimine-grafted polyamidoamine was obtained.

Assistant 5

256 g of a 50.4% strength aqueous solution of a polyethyleneimine of molecular weight 430 (Assistant 5a for Comparative Example 4) were introduced into a 1 liter four-necked flask equipped with a stirrer, reflux condenser, thermometer and dropping funnel, and were heated to 85° C. After removing the heating bath, 114 g of benzyl chloride were added dropwise to the charge, resulting in a temperature rise to 93° C. After completion of the addition, the reaction mixture was stirred for a further half hour at 90° C. and then diluted with 116 g of distilled water and cooled. 485 g of a partially benzylated polyethyleneimine, having a solids content of 50.1%, were obtained.

Assistant 6

Following the method described for Assistant 5, 259 g of a 49.9% strength aqueous solution of a polyethyleneimine of molecular weight 1,500 were alkylated with 228 g of benzyl chloride. After completion of the alkylation reaction, 227 g of distilled water were added to the reaction mixture and 713 of a partially benzylated polyethyleneimine of 49.6% solids content were obtained.

Assistant 7

151 g of a 52.1% strength aqueous solution of polyethyleneimine of molecular weight 258 (Assistant 7a for Comparative Example 4) were introduced into a 1 liter four-necked flask equipped with a stirrer, reflux condenser, thermometer and dropping funnel, and were heated to 90° C. The heating bath was then removed and 84 g of benzyl chloride were added to the reaction mixture in the course of 20 minutes, during which the temperature remained at 90° C. because of the exothermic reaction. After addition of the benzyl chloride, the reaction solution was heated for half an hour at 90° C., a solution of 21 g of cyanamide in 21 g of distilled water was then added as a single shot, and the mixture was stirred for 5 hours at 90° C. Thereafter, the aqueous solution was diluted with 89 g of distilled water and 366 g of a 50% strength aqueous solution of a polyethyleneimine modified with benzyl chloride and cyanamide were obtained.

Assistant 8

507 g of a 42.4% strength aqueous solution of a polyethyleneimine of molecular weight 860 were introduced into a 2 liter four-necked flask equipped with a stirrer, reflux condenser, thermometer and dropping funnel, and were heated to 90° C. 300 g of styrene oxide were then added in the course of 3 hours, with thorough mixing. Thereafter, the reaction solution was heated for a further hour at 90° C., cooled and mixed with 223 g of distilled water. 1,028 g of a 50.2% strength aqueous solution of a styrene oxide-modified polyethyleneimine were obtained.

Assistant 9 (prior art)

267 g of a 48.3% strength polyethyleneimine of molecular weight 860 were heated to 85° C. in a 1 liter four-necked flask equipped with a stirrer, reflux condenser, thermometer and gas inlet tube. 53 g of ethylene oxide were then passed into the solution in the course of 4 hours, at 85° C., after which the mixture was stirred for a further hour at the same temperature. The solution was then diluted with 44 g of distilled water. 364 g of a 50% strength aqueous solution of a polyethyleneimine partially modified with ethylene oxide were obtained.

Assistant 10 (prior art)

259 g of a 49.9% strength aqueous solution of a polyethyleneimine of molecular weight 1,500 were introduced into a 1 liter four-necked flask equipped with a stirrer, reflux condenser, thermometer and dropping funnel, and were heated to 30° C. When this temperature had been reached, 378 g of dimethyl sulfate were added dropwise, in the course of 2 hours, at a rate such that the temperature did not rise above 50° C. Thereafter, the reaction mixture was stirred for a further hour at 50° C. and then heated for half an hour at 80° C. 630 g of an aqueous solution of a dimethyl sulfate-modified polyethyleneimine were obtained.

Assistant 11 (prior art)

202 g of a 49.9% strength aqueous solution of a polyethyleneimine of molecular weight 1,500 were introduced into a 2 liter four-necked flask equipped with a stirrer, reflux condenser, thermometer and dropping funnel, and were heated to 45° C., with stirring. 266 g of dimethyl sulfate were added dropwise in the course of 2 hours, with stirring, and in part with cooling, under conditions such that the reaction temperature was 45°–50° C. The mixture was then neutralized by dropwise addition of 174 g of 48.5% strength aqueous sodium hydroxide solution. The resulting mixture was heated to 90° C. and 324 g of dimethyl sulfate were added dropwise at that temperature with stirring. The excess dimethyl sulfate was neutralized with 19 g of 48.5% strength aqueous sodium hydroxide solution and the mixture was then heated for a further 3 hours at 90° C. 984 g of an aqueous solution of a dimethyl sulfate-quaternized polyethyleneimine were obtained.

Assistant 12

623 g of aminoethylpiperazine and 718 g of distilled water were introduced into a 4 liter four-necked flask equipped with a stirrer, reflux condenser, thermometer and dropping funnel, and were heated to 80° C. At this temperature, 444 g of epichlorohydrin were added dropwise in the course of 3 hours, with cooling, and the reaction temperature was then kept for 4 hours at 80°–85° C., after which the chloride content was 2.68 milliequivalents/g (Assistant 12a for Comparative Example 4).

201 g of distilled water and 80 g of 50% strength aqueous sodium hydroxide solution were added to 369 g of the aminoalkylpiperazine/epichlorohydrin resin (containing 43.9% of active ingredient). 126 g of benzyl chloride were then added dropwise in the course of 1 hour, at 80° C., and the reaction mixture was subsequently stirred for 2 hours at 90° C. The chloride content was 2.77 milliequivalents/g. 437 g of distilled water and 420 g of 100% strength formic acid were added to the reaction solution, which then had a pH of 2.66 and contained 20% of active ingredient.

Assistant 13

349 g of N,N'-bis-(3-aminopropyl)-ethylenediamine and 497 g of distilled water were introduced into a 2 liter four-necked flask equipped with a stirrer, reflux condenser, thermometer and dropping funnel, and were heated to 80° C. 148 g of epichlorohydrin were added dropwise in the course of one hour and the reaction temperature was kept at from 80° to 85° C. by cooling the flask. The chloride content of the resulting solution was 1.66 milliequivalents/g. 508 g of benzyl chloride were then added dropwise to the solution over one hour at 80° C., with cooling, and the reaction was then allowed to continue for 2 hours at 80° C. 1,502 g of an aqueous resin solution, containing 66.7% of active ingredient, were obtained. The chloride content was 3.77 milliequivalents/g.

Assistant 14

750 g of the 66.7% strength Assistant 13 were reacted with a solution of 50 g of cyanamide in 50 g of distilled water in a 1 liter four-necked flask at 90° C. The reaction was complete after 5 hours at 90° C. 218 g of distilled water were then added and 1,068 g of a 49.9% strength aqueous solution of a cyanamide-modified benzylated amine-epichlorohydrin resin were obtained.

Assistant 15

378 g of tetraethylenepentamine and 581 g of distilled water were introduced into a 2 liter four-necked flask equipped with a stirrer, reflux condenser, thermometer and dropping funnel, and were heated to 80° C. 203 g of dichlorohydrin ether were added dropwise in the course of half an hour at this temperature, with cooling, and the batch was then allowed to react for a further 13 hours at 80° C. The chloride content of the resulting solution was 1.76 milliequivalents/g. 630 g of benzyl chloride were added dropwise to the solution in the course of 1 hour, with cooling, and the reaction temperature was then kept at 80° C. for 6 hours. After completion of the reaction, the chloride content was 3.92 milliequivalents/g. 1,790 g of a 66.1% strength aqueous solution of the cationic Assistant 15 were obtained.

Assistant 16

896 g of the cationic Assistant 15 were heated to 90° C. in a 2 liter four-necked flask equipped with a stirrer, reflux condenser, thermometer and dropping funnel, and a solution of 63 g of cyanamide in 63 g of distilled water was added as a single shot. The reaction mixture was heated at 90° C. for 5 hours, after which 327 g of distilled water were added. 1,349 g of a 50% strength aqueous solution of a cationic assistant were obtained.

In the Examples which follow, the invention is first illustrated by experiments in which anionic dyes are removed from aqueous solution and then by experiments in which interfering substances are removed, which usually detract from the effectiveness of retention aids, flocculants and drainage aids.

EXAMPLE 1

(a) 300 mg of a commercial alkali-activated bentonite were added to a solution of 30 mg of the acid dye C.I. 15,510 in one liter of distilled water, and 100 mg of Assistant 1 were added, followed by 100 mg of aluminum sulfate ($Al_2(SO_4)_3.18H_2O$). After the mixture had been left to stand for 10 minutes, the solid constituents were filtered off and the residual dye content in the aqueous solution was determined colorimetrically. 6% of the dye employed were found in the filtrate.

(b) In order to achieve more rapid sedimentation of the lake, 5 mg of a commercial high molecular weight cationic polyacrylamide were added to the suspension obtained. Coarse, easily filtered flocs formed after the mixture had stood for only 5 minutes.

EXAMPLE 2

(a) 500 mg of a commercial alkali-activated bentonite were added to a solution of 30 mg of the acid orange dye C.I. 15,510 in one liter of distilled water, and 100 mg of Assistant 1 were then introduced. After the mixture had stood for 10 minutes, the lake was filtered off and the residual dye content in the filtrate was determined colorimetrically. 10% of the dye employed were found to be present in the filtrate.

(b) In order to achieve more rapid sedimentation of the lake, 2 mg of a commercial high molecular weight cationic polyacrylamide were added to the suspension obtained according to Example 2. 5 minutes after addition of the flocculant, it was possible to filter off the lake.

COMPARATIVE EXAMPLE 1

When Example (1a) was repeated without Assistant 1, the filtrate was found to contain 88% of the dye employed.

COMPARATIVE EXAMPLE 2

When Example (1b) was repeated in the absence of Assistant 1 and in the absence of the cationic polyacrylamide, the filtrate was found to contain 92% of the dye employed.

COMPARATIVE EXAMPLE 3

When Example (1a) was repeated using, in place of Assistant 1, an equal amount of its non-benzylated intermediate, ie. polyethyleneimine of molecular weight 1,500, the filtrate was found to contain 56% of the dye originally employed.

EXAMPLE 3

Example (1a) was repeated several times, but in each case, in place of 100 mg of Assistant 1, one of the assistants shown in Table 1, in the amounts also shown there, was employed. The residual content of dye in the filtrate is also indicated in Table 1.

TABLE 1

| Assistant No. | Amount of assistant added (mg) | % of dye in the filtrate, based on dye employed |
|---|---|---|
| 1 | 10 | 44 |
|   | 25 | 28 |
|   | 50 | 15 |
|   | 200 | 3.2 |
| 2 | 10 | 40 |
|   | 25 | 26 |
|   | 50 | 17 |
|   | 100 | 7.3 |
|   | 200 | 4.2 |
| 3 | 10 | 59 |
|   | 25 | 32 |
|   | 50 | 18 |
|   | 100 | 9.6 |
|   | 200 | 2.8 |
| 4 | 10 | 35 |
|   | 25 | 26 |
|   | 50 | 14 |
|   | 100 | 7.9 |
|   | 200 | 5.3 |
| 5 | 100 | 6.8 |
| 6 | 100 | 7.2 |
| 7 | 100 | 9.2 |
| 8 | 100 | 6.8 |
| 12 | 100 | 7.8 |
| 13 | 100 | 6.9 |
| 14 | 100 | 8.3 |
| 15 | 100 | 7.4 |
| 16 | 100 | 6.3 |

COMPARATIVE EXAMPLE 4

Example (1a) was repeated several times, in each case using, in place of Assistant 1, one of the non-benzylated assistants shown in Table 2, in the amounts also shown there. As may be seen from Table 2, the filtrate contained substantially higher residual amounts of dye.

TABLE 2

| Assistant No. | Amount of assistant added (mg) | % of dye in the filtrate, based on dye employed |
|---|---|---|
| 1a | 10 | 86 |
|   | 25 | 80 |
|   | 50 | 71 |
|   | 200 | 43 |
| 3a | 10 | 90 |
|   | 25 | 73 |
|   | 50 | 61 |
|   | 100 | 53 |
|   | 200 | 52 |
| 4a | 10 | 95 |
|   | 25 | 88 |
|   | 50 | 75 |
|   | 100 | 63 |
|   | 200 | 48 |
| 5a | 10 | 93 |
|   | 25 | 88 |
|   | 50 | 82 |
|   | 100 | 66 |
|   | 200 | 53 |
| 7a | 100 | 85 |
| 12a | 100 | 81 |

EXAMPLE 4

Example (1a) was repeated using 100 mg of the red direct dye C.I. 28,160 instead of the acid orange dye C.I. 15,510. In this case, the filtrate contained 1.2% of the dye employed.

COMPARATIVE EXAMPLE 5

Example 4 was repeated, using the non-benzylated Assistant (1a) (polyethyleneimine) in place of Assistant 1. In this case, the filtrate contained 8.8% of the dye employed.

EXAMPLE 5

300 mg of a finely milled aluminum silicate (china clay) were added to a solution of 30 mg of the acid orange dye C.I. 15,510 in one liter of distilled water, and 200 mg of aluminum sulfate ($Al_2(SO_4)_3 \cdot 18H_2O$) were then introduced, followed by 100 mg of Assistant 1. After the mixture had been allowed to stand for 10 minutes, the lake was filtered off. The filtrate contained 6.5% of the dye employed.

EXAMPLE 6

Example 5 was repeated, omitting the aluminum silicate. A very flocculant, easily filtered precipitate was obtained. The filtrate contained 11% of the dye employed.

EXAMPLE 7

100 mg of Assistant 1 and 300 mg of one of the mineral adsorbents shown in Table 3 were added to a solution of 100 mg of the red direct dye C.I. 28,160 in one liter of distilled water, the experiment being in each case carried out once in the absence and once in the presence of 100 mg of aluminum sulfate, as shown in the Table. The various adsorbents used and the resulting residual contents of dye in the filtrate are shown in Table 3.

TABLE 3

| Mineral adsorbent employed | Aluminum sulfate added (100 mg) | % of dye in the filtrate, based on dye employed |
|---|---|---|
| Montmorillonite | + | 1.2 |
| Montmorillonite | − | 10.2 |
| China clay X1 (Al silicate) | + | 5.1 |
| China clay X1 (Al silicate) | − | 37 |
| Titanium dioxide | + | 15 |
| Titanium dioxide | − | 39 |
| Talc | + | 6.4 |
| Talc | − | 37 |
| Alumina | + | 4.3 |
| Alumina | − | 14 |
| Satin white (calcium sulfo-aluminate) | + | 8.6 |
| Satin white (calcium sulfo-aluminate) | − | 27 |
| Chalk ($CaCO_3$) | + | 10 |
| Chalk ($CaCO_3$) | − | 36 |

EXAMPLE 8

Examples 1 to 7 were repeated, but instead of the finely milled mineral adsorbents aqueous slurries of the adsorbents mentioned in the various Examples were used, the adsorbents having been mixed with the assistants mentioned in Examples 1 to 7 prior to addition to the colored water. In every case, virtually the same effect was achieved as when separately adding the mineral adsorbent and assistant.

EXAMPLE 9

Example 8 was repeated, but the mixture of mineral adsorbent and the particular assistant used was milled or kneaded and was only then employed to remove the dye from the water. The results obtained were virtually the same as in Examples 1 to 7.

COMPARATIVE EXAMPLE 6

Example 1 was repeated several times, using, in place of 100 mg of Assistant 1, 100 mg of Assistant 9, 10 or 11, the alkylation of these having been carried out with an alkylating agent not containing an aromatic substituent. The filtrate in these cases had a substantially higher content of the residual dye.

TABLE 4

| Assistant No. | % dye in the filtrate, based on dye employed |
| --- | --- |
| 9 | 54 |
| 10 | 57 |
| 11 | 61 |

The Examples which now follow show that by using the process according to the invention the adverse effect of humic acid and other anionic substances on the drainage rate using conventional drainage aids can be reduced or even completely eliminated.

EXAMPLE 10

(a) 1,000 ml of a newsprint stock of consistency 2 g/l are poured onto the wire of a Schopper-Riegler freeness tester. The time required for 700 ml of fluid to pass through the wire is measured.

(b) 0.2% of a commercial drainage accelerator (a polyamidoamine grafted with ethyleneimine and cross-linked) are added to the model stock referred to under (a).

(c) Model stock as in (a), but additionally containing 5 mg of humic acid in 100 ml of water.

(d) Model stock as in (c), but additionally containing 0.2% of drainage aid.

(e) Model stock as in (c), but additionally containing 10 mg of bentonite, 10 mg of Assistant 1 and 10 mg of alum.

(f) Model stock as in (e), but additionally containing 0.2% of drainage aid.

The drainage rates found are shown in Table 5. Experiment (f) shows that the full effect of the drainage aid is restored if the process according to the invention is employed.

TABLE 5

| | Drainage rate | |
| --- | --- | --- |
| Model stock | in the absence of a drainage aid [sec] | in the presence of 0.2% of a drainage aid [sec] |
| a | 95 | |
| b | | 66 |
| c | 101 | |
| d | | 100 |
| e | 101 | |
| f | | 60 |

EXAMPLE 11

The drainage time of a newsprint stock is determined as in Example 10. 100 ml of a hot water extract of pinewood, such as results on grinding the wood, are added as the anionic substance which interferes with the effect of the cationic drainage aid. It is known that this type of extract interferes with the effectiveness of drainage aids in paper manufacture. The starting materials, and the drainage times achieved, are shown in Table 6. It may be seen from the Table that by using the process according to the invention the effectiveness of the drainage aid can be partially restored.

TABLE 6

| | | Drainage rates [sec] | |
| --- | --- | --- | --- |
| | | without a drainage aid | in the presence of 0.2% of a commercial drainage aid |
| a | Paper stock + 100 ml of water | 95 | 66 |
| b | Paper stock as in a + 100 ml of wood extract | 121 | 113 |
| c | as in b + 10 mg of bentonite + 10 mg of alum | 114 | 111 |
| d | as in c + 10 mg of Assistant 1 | 118 | 90 |

We claim:

1. A method which is capable of removing acid dyes from water which is recycled in manufacturing processes and from wastewater, comprising:
   (a) adding to recycled water or waste water (1) an amount of a water soluble polymeric cationic assistant roughly corresponding to the amount of acid dyes in said recycled water or said wastewater, said cationic assistant being the reaction product of an alkylating agent containing an aromatic substituent with a cationic polyelectrolyte containing aminoalkyl groups selected from the group consisting of polyethyleneimines, polyvinylamines, the reaction products of ammonia or amines with 1,2-dichloroethane, epichlorohydrin, dichlorohydrin or chlorohydrin ethers of dihydric or polyhydric alcohols, polyamidoamines which are obtained by reacting a dicarboxylic acid of 4-10 carbon atoms with polyalkylenepolyamines possessing 3-10 basic nitrogen atoms in the molecule, polyamidoamines obtained by condensing acrylic or methacrylic ester with diamines or with polyalkylenepolyamines having 3-10 basic nitrogen atoms, polyamidoamines which contain from 20 to 400 parts by weight of grafted-on ethyleneimine per 100 parts by weight of a polyamidoamine, and condensates of urea with bis-aminoethylmethylamine and (2) at least one mineral adsorbent selected from the group consisting of aluminosilicate, chalk, titanium dioxide, bauxite, and calcium sulfoaluminate, the weight ratio of said adsorbent to polymeric cationic assistant ranging from 20:1 to 0.5:1;
   (b) insolubilizing the acid dyes in said wastewater or recycled water as a result of said treatment; and
   (c) separating the insolubilized material from said treated water.

2. The process of claim 1, wherein said alkylating agent is a benzyl halide, styrene oxide, a chloromethylbiphenyl, a bischloromethylbiphenyl or a β-halomethylnaphthalene.

3. The process of claim 2, wherein said alkylating agent is benzylchloride or styrene oxide.

4. The process of claim 1, wherein said water-soluble polymeric cationic assistant (1) is modified by further reaction with cyanamide, dicyandiamide or mixtures thereof.

5. The process of claim 1, wherein the materials added to said recycled water or said wastewater further comprise a flocculant.

6. The method of claim 1, wherein said components (1) and (2) are mixed prior to use.

7. The method of claim 1, wherein said component (1), followed by component (2), is added to said recycled water or said wastewater.

8. The method of claim 1, wherein the materials added to said recycled water or said wastewater further comprise magnesium, iron, or aluminum salts.

9. The method of claim 8, wherein the salt added is alum or aluminum sulfate.

10. The process of claim 1, wherein said component (2) is a bentonite.

11. The method of claim 1, wherein said mineral adsorbent has a particle size ranging from 0.2–500 $\mu$m.

* * * * *